(12) United States Patent
Belanger et al.

(10) Patent No.: US 10,899,319 B2
(45) Date of Patent: Jan. 26, 2021

(54) FLUID DELIVERY SYSTEM FOR A VEHICLE WASH SYSTEM

(71) Applicant: WashMe Properties, LLC, Northville, MI (US)

(72) Inventors: Michael J. Belanger, Northville, MI (US); Curtis S. Prater, Warren, MI (US); Barry S. Turner, Novi, MI (US)

(73) Assignee: Belanger, Inc., Northville, MI (US)

( * ) Notice: Subject to any disclaimer, the term of this patent is extended or adjusted under 35 U.S.C. 154(b) by 0 days.

(21) Appl. No.: 15/135,220

(22) Filed: Apr. 21, 2016

(65) Prior Publication Data

US 2016/0311407 A1 Oct. 27, 2016

Related U.S. Application Data

(60) Provisional application No. 62/150,373, filed on Apr. 21, 2015.

(51) Int. Cl.
*B60S 3/04* (2006.01)
*A46B 13/00* (2006.01)
*B08B 1/00* (2006.01)
*B08B 3/02* (2006.01)

(52) U.S. Cl.
CPC ............... *B60S 3/04* (2013.01); *A46B 13/00* (2013.01); *A46B 13/005* (2013.01); *B08B 1/002* (2013.01); *B08B 3/02* (2013.01)

(58) Field of Classification Search
None
See application file for complete search history.

(56) References Cited

U.S. PATENT DOCUMENTS

| | | | | |
|---|---|---|---|---|
| 3,253,741 | A * | 5/1966 | Russell | B60S 3/044 222/52 |
| 3,279,093 | A * | 10/1966 | Dutton | B60S 3/002 34/229 |
| 8,771,431 | B2 | 7/2014 | Kaipainen | |
| 8,990,993 | B2 | 3/2015 | Belanger | |
| 2009/0272409 | A1 * | 11/2009 | Petit | B60S 3/002 134/32 |
| 2010/0186778 | A1 * | 7/2010 | Martin | B08B 3/024 134/34 |
| 2012/0187219 | A1 * | 7/2012 | Criscione, II | B05B 1/083 239/436 |
| 2013/0239992 | A1 | 9/2013 | Detrick | |

FOREIGN PATENT DOCUMENTS

CN 103587505 A 2/2014

OTHER PUBLICATIONS

European International Search Report dated Jun. 20, 2016.

* cited by examiner

*Primary Examiner* — Rita P Adhlakha
(74) *Attorney, Agent, or Firm* — Dickinson Wright PLLC

(57) ABSTRACT

A vehicle wash system includes a vehicle treatment component located adjacent a vehicle treatment area for treating a vehicle exterior. The system includes at least one fluid delivery nozzle associated with the vehicle treatment component. The fluid delivery nozzle is in communication with a source of fluid and includes a first state of operation with a first flow rate and a second state of operation with a second flow rate. The first and second flow rates are different. The system allows the fluid flow through the fluid delivery nozzle to be selectively varied while a vehicle is disposed in the vehicle treatment area adjacent the vehicle treatment component.

23 Claims, 4 Drawing Sheets

FLUID DELIVERY SYSTEM FOR A VEHICLE WASH SYSTEM

CROSS-REFERENCE TO RELATED APPLICATIONS

The present application claims priority to U.S. Provisional Patent Application Ser. No. 62/150,373, filed Apr. 21, 2015, and entitled "Fluid Delivery System for a Vehicle Wash System", which is hereby incorporated by reference as though set forth fully herein.

TECHNICAL FIELD

The present disclosure relates generally to a fluid delivery system for a vehicle wash system. More particularly, the present disclosure relates to a fluid delivery system that controls the flow of fluid being emitted from one or more fluid delivery sources to optimize the wash process.

BACKGROUND OF THE DISCLOSURE

Current vehicle wash facilities employ individual nozzles that emit fluid for use in the vehicle wash process. These nozzles are typically configured to emit fluid such as water, soap and/or chemical onto a vehicle exterior surface as part of the vehicle wash process. The fluid emitted onto the vehicle exterior serves to wet the vehicle and/or work with rotary brushes that contact the vehicle exterior to assist with the removal of dirt therefrom. The fluid can also be emitted onto the rotary brushes directly to assist with the vehicle cleaning process.

With these existing processes, the fluid is emitted from these nozzles in a constant stream such that the rate at which the fluid is emitted does not change. This results in a significant amount of water loss and results in the use of significantly more water than is needed for a given wash process.

SUMMARY OF THE DISCLOSURE

It is therefore an aspect of the present disclosure to provide a fluid delivery system including one or more fluid delivery orifices where the fluid delivery system is configured to vary the rate at which fluid is emitted from the one or more fluid delivery orifices during a wash process.

It is another aspect of the present disclosure to provide a fluid delivery system including one or more fluid delivery orifices where the fluid delivery system is configured to pulse fluid through the one or more orifices such that the flow rate is intermittently on and off.

It is still another aspect of the present disclosure to provide a fluid delivery system for a vehicle wash system that provides improved cleaning capabilities.

It is yet another aspect of the present disclosure to provide a fluid delivery system for a vehicle wash system that can yield significant water and energy savings.

It is still a further aspect of the present disclosure to provide a fluid delivery system for a vehicle wash system that can improve efficiency of the wash process and can yield cost savings.

It is still yet another aspect of the present disclosure to provide a fluid delivery system for a vehicle wash process that allows the flow of fluid to be controlled and modified to account for varying wash conditions.

In accordance with the above and the other aspects of the present disclosure an improved vehicle wash system is provided as shown and described. The vehicle wash system includes a vehicle treatment component and at least one fluid delivery orifice associated with the vehicle treatment component. The fluid delivery orifice is in communication with a source of fluid and is configured to emit a steam of fluid therefrom. The system includes a controller in communication with the at least one fluid delivery orifice, with the controller being configured to vary the flow of fluid from the source of fluid through the at least one fluid delivery orifice.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE DISCLOSURE

The present disclosure relates generally to a fluid delivery system for use as part of a vehicle wash system. The fluid delivery system may be incorporated into any suitable vehicle wash system, such as a conveyor or in-bay wash system. It will be appreciated that the disclosed fluid delivery system may be employed in connection with a variety of other applications or systems, including self-service wash systems. It will also be appreciated that the disclosed fluid delivery system may also have a variety of different configurations and may operate in a variety of other suitable ways.

Figure 1:
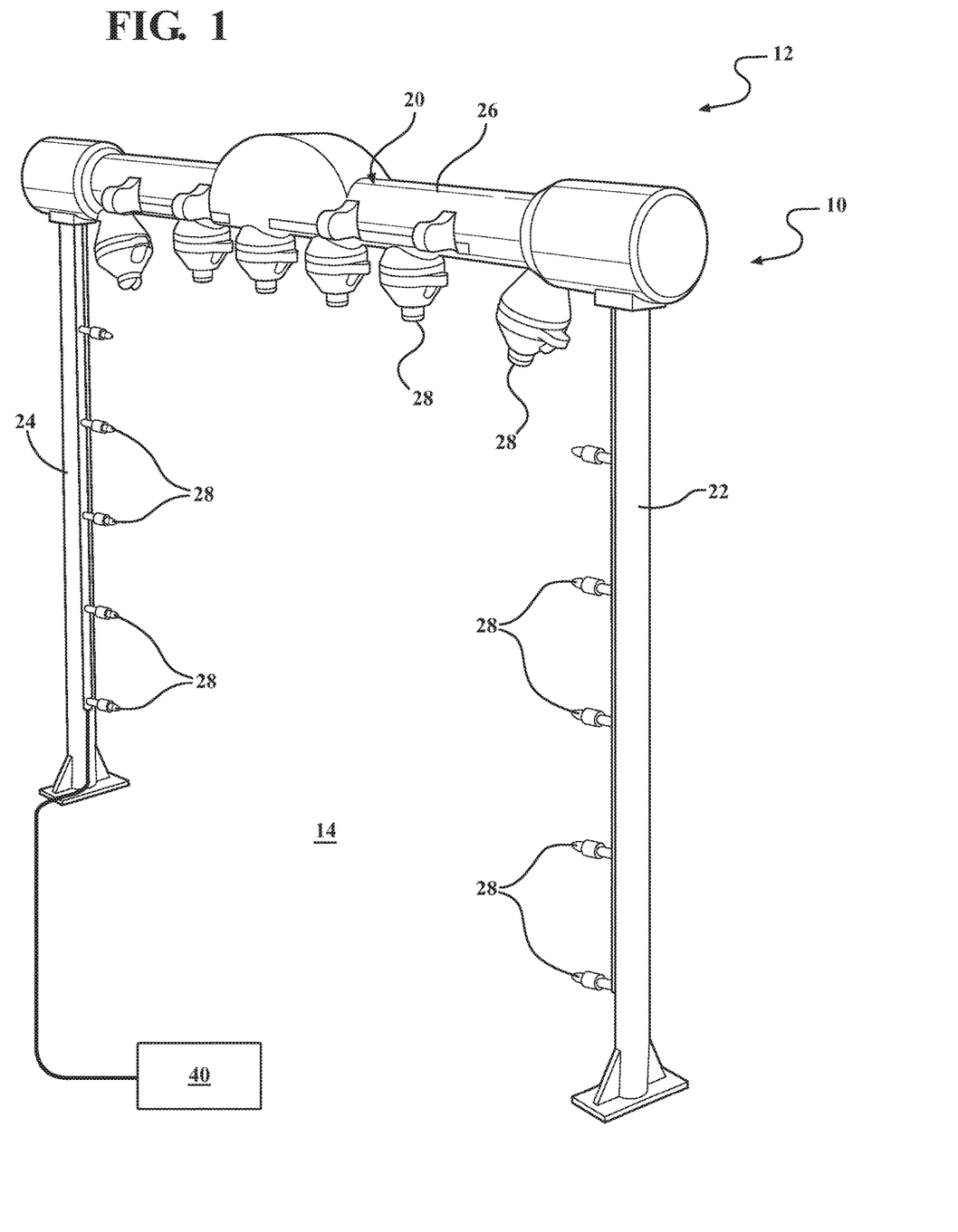
FIG. 1 is a schematic illustration of a fluid delivery system for a vehicle wash process in accordance with an aspect of the disclosure.

According to an exemplary aspect, with reference to FIG. 1, a fluid delivery system 10 may be employed in a vehicle wash facility and may be utilized as part of a vehicle wash system. The fluid delivery system 10 may include one or more vehicle treatment components 12 that are disposed adjacent a vehicle treatment area 14. According to an aspect, an exemplary vehicle treatment component 12 may be embodied as a rinse arch 20, having a pair of ground engaging legs 22, 24 and an overhead portion 26 that spans the vehicle treatment area 14. According to a further aspect, the rinse arch 20 may include a plurality of fluid emitting nozzles 28 that are configured to direct fluid onto a vehicle exterior while it is disposed in the vehicle treatment area 14. The fluid delivery nozzles 28 may be disposed on each of the pair of ground engaging legs 22, 24 as well as the overhead portion 26. The fluid delivery nozzles 28 may be in communication with a source of fluid. The source of fluid may be water, soap, or a chemical or a variety of other suitable types of fluids. It will also be appreciated that fluid can be emitted through any type of orifice.

It will be appreciated that the fluid delivery nozzles 28 may be disposed in a variety of other suitable locations on the rinse arch 20. Additionally, more or less fluid delivery nozzles 28 may be employed. It will also be appreciated that the fluid delivery nozzles 28 can be employed on a variety of other vehicle wash components, including as discussed herein.

According to an aspect, the fluid delivery nozzles 28 may be configured such that they can be toggled between a first state and a second state. According to this aspect, the first state may be an "on" state in which fluid is permitted to pass through the fluid delivery nozzles 28. According to this aspect, the second state may be an "off" state in which fluid is prevented from passing through the fluid delivery nozzles 28. According to one aspect, each of the nozzles 28 may be configured with a closure mechanism that can be actuated to allow the nozzles to be toggled between the on state and the off state. According to an aspect, the closure mechanism can be a solenoid valve, including a relay and a potentiometer, such that the mechanism for changing states is disposed on the equipment itself. Additionally, a self-delayed on/off timer can also be employed. It will also be appreciated that other suitable closure mechanism that allow for local mechanical actuation of the states may be employed. According to another aspect, actuating the on and off states of the fluid delivery nozzles 28 during a vehicle wash process can allow the flow of fluid onto the vehicle exterior to be pulsed on and off intermittently. Put another way, this functionality allows for pulsing fluid through the nozzles in a controlled manner during the vehicle wash process such that a constant stream of fluid is not being applied to a vehicle exterior.

According to a still further aspect, the fluid delivery system 10 can include a central controller 40, which is in communication with each of the fluid delivery nozzles 28. The central controller 40 can allow the states of each of the nozzles 28 to be controlled and changed remotely instead of locally at the equipment itself. This allows for control of the entire wash system in a uniform fashion such that nozzles on a multitude of different vehicle treatment components can be controlled. According to an aspect, the controller 40 can include a processor that employs programmable logic, such as may be embodied in hardware, firmware or software so as to control fluid flow through the fluid delivery nozzle 28 by way of a programmed algorithm.

It is known that fluid nozzles employed in conventional wash processes, generally emit fluid at a rate of approximately 1 gallon per minute. According to an aspect of the present disclosure, the fluid delivery nozzles 28 can be sized to emit fluid in a higher quantity than is utilized in current vehicle wash systems. For example, the fluid delivery nozzles 28 can be configured to emit fluid at a rate of approximately 2 gallons per minute. Increasing the rate at which the fluid is emitted from the fluid delivery nozzles 28 can provide significant benefits. For example, emitting a larger mass or volume of fluid from the nozzles 28 can ensure that more fluid reaches the vehicle exterior as less atomization will occur. Additionally, the resultant large droplets of fluid emitted from the fluid delivery nozzles 28 can travel a longer distance. This allows more fluid force to be applied to the vehicle exterior surface, which can provide improved cleaning capabilities. Additionally, the application of larger volumes of fluid minimizes the impact of temperature changes as can occur in warm areas, such as Arizona where higher temperatures can cause significant fluid evaporation, which can negatively impact the wash process. This allows for an optimum wash to be achieved regardless of weather conditions.

According to another aspect, the fluid delivery nozzles 28 can be configured with a closure mechanism that allows the fluid delivery nozzles to be operated in on and off states. In the on state, the fluid delivery nozzles 28 can emit a larger volume of fluid. The larger volume can impact the vehicle exterior at a larger force, which can assist in removing dirt that would otherwise not be removed. In the off state, the fluid delivery nozzles 28 can be prevented from emitting fluid. By this configuration, the same amount of fluid can ultimately be emitted from the nozzles over a given period of time. According to another aspect, the fluid delivery nozzles 28 can be controlled such that a smaller volume of fluid is ultimately utilized during a vehicle wash process, despite the fact that the fluid is emitted at a greater volume when the fluid delivery nozzles are in the on state. This can result in significant fluid savings. According to still another aspect, the fluid delivery nozzles 28 can be controlled to emit a greater volume of fluid as desired or needed. According to a further aspect, in the on state, the fluid emitted from the fluid delivery nozzles 28 can be at a conventional flow rate of 1 gallon per minute such that when it is in the off state significant fluid and energy savings can be achieved.

It will be appreciated that varying flow rates for the on state can be employed. It will further be appreciated that the period between states may be varied. According to an aspect, the time period for the on state may be the same as the time period for the off state. For example, the time periods for each state could be 1 second or 0.5 seconds or a variety of other suitable periods. It will also be appreciated that the time periods for each state could be unequal with one state having a longer time period then the other. It will further be appreciated that the intervals for each of the states can vary during a single wash process to account for changing conditions within the wash.

According to still another aspect, the controller 40 can be configured with control logic such that the states of the fluid delivery nozzles 28 could correspond to different flow rates instead of on and off states, as discussed above. According to this aspect, this could allow the flow of fluid through the nozzles 28 to be varied such that different amounts of fluid are applied at different times or to account for different conditions. For example, one state could correspond to a front of a vehicle and another state could correspond to a back of a vehicle. According to this example, the nozzles 28 could be configured to emit fluid at one rate (a first state or mode of operation) onto the front of a vehicle and at a second rate (a second state or mode of operation) onto the back of a vehicle. This would enable the use of the same arch and nozzle configuration to deliver different amounts of water and chemical where the wash operator wanted it with respect to the vehicle. According to another example, the flow rates or modes of operation could be varied based on a predetermined interval. It will also be appreciated that more modes or states could also be employed. Additionally, varying the rate at which fluid flows through the nozzles 28 can allow for accommodation of changing dirt conditions. Allowing for the sophisticated control of fluid flow as needed by way of a software algorithm, can allow for improved cleaning of the vehicle exterior as well as increased energy savings and cost savings by reducing energy and fluid use when not needed.

Figure 2:
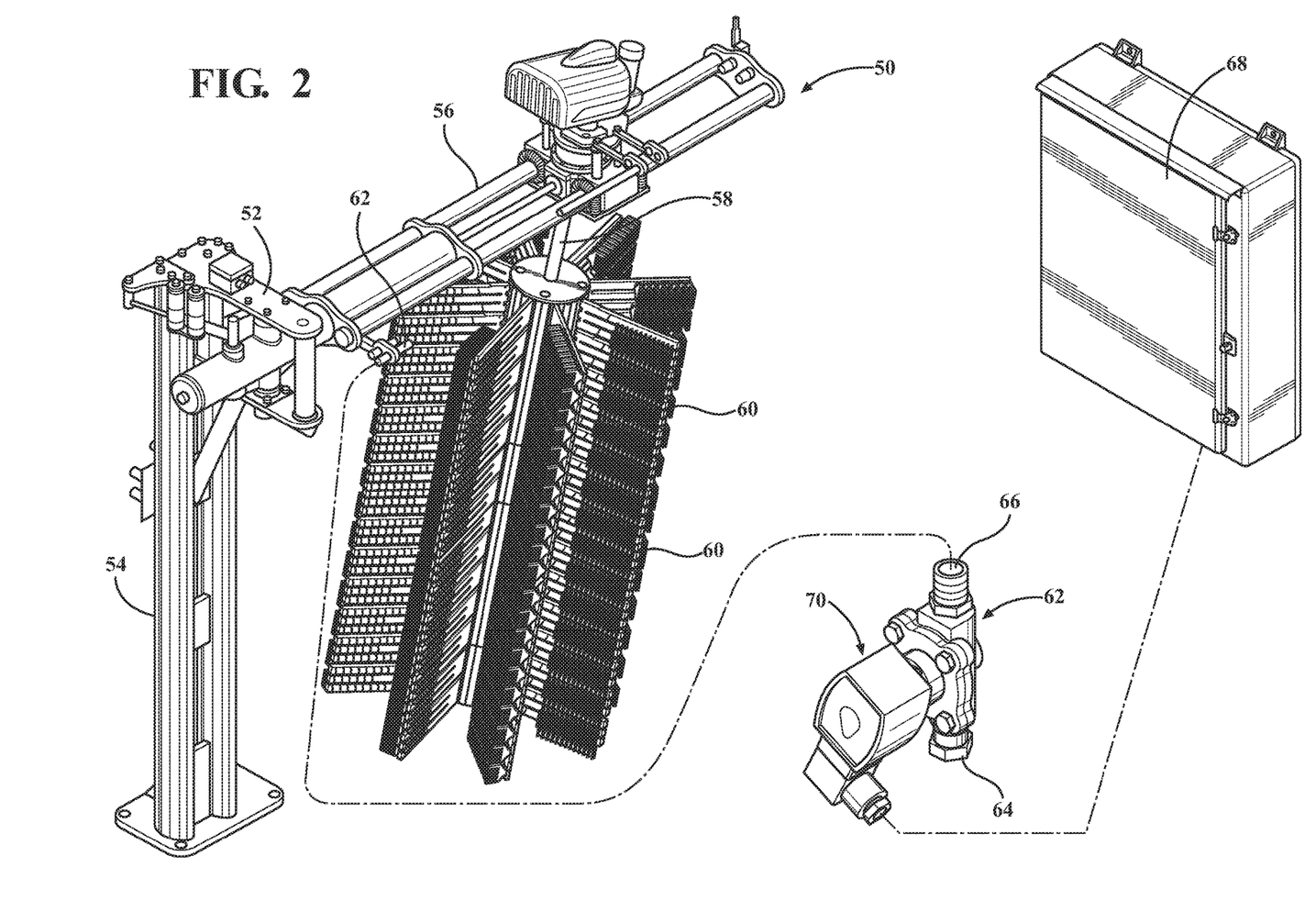
FIG. 2 is a schematic illustration of a fluid delivery system for a vehicle wash process in accordance with another aspect of the present disclosure.

According to another aspect and with reference to FIG. 2, the vehicle wash component could be configured as a wrap-around brush 50, which includes a frame portion 52 having a vertical support 54 and a horizontal arm portion 56. The horizontal arm portion 56 can support a shaft portion 58 rotatable about a vertical axis of rotation. The shaft portion 58 can be in communication with a plurality of wash media elements 60 that are configured to contact a vehicle exterior and effectuate the washing process. The wash media elements 60 may be conventional cloth wash media elements. According to another aspect, the wash media elements 60 could be self-supporting media elements as described in applicant's U.S. Pat. No. 8,990,993, entitled "Vehicle Wash Component", which is hereby incorporated by reference as though set forth fully herein.

According to an aspect, one or more fluid nozzles 62 could be disposed on the horizontal arm portion 56 to communicate with the wash media elements 60 in order to emit fluid directly thereon for use in the vehicle wash process. According to this aspect, the fluid may be a water and chemical mix that can be used for treating the vehicle exterior. According to another aspect, the plurality of fluid nozzles 62 could be configured to emit fluid onto the wash media elements 60 in a pulsed fashion such that the fluid is emitted intermittently as opposed to being emitted in a constant stream in a manner discussed above. This can result in a savings of both water and chemical of up to as much as 50% and greater. As discussed above, the nozzles 62 can be configured to emit larger droplets of fluid, which provides benefits. Additionally, the nozzles 62 can be controlled such that they are cycled between different states, such as enabled and disabled states, on and off states, or states associated with different flow rates. The nozzles 62 can be controlled by a mechanical closure mechanism. Alternatively, the nozzles 62 can be controlled by more sophisticated control logic, such as by a central controller that includes software/firmware for effectuating control of fluid emission through the fluid delivery nozzles 62, as is discussed above.

According to an aspect as shown, the fluid nozzles 62 can be configured as solenoid valves with an inlet 64 in communication with a fluid supply line and configured to receive fluid from a fluid source. The fluid nozzles 62 can include a fluid outlet 66 that is configured to emit fluid onto the wash media elements 60. According to another aspect, the fluid nozzles 62 can communicate with a controller 68 which controls the state of the fluid nozzles. For example, the controller 68 can send a signal to the fluid nozzles 62 to vary their state from an on state to an off state or from a low flow state to a high flow state in the manner discussed above.

Figure 3:
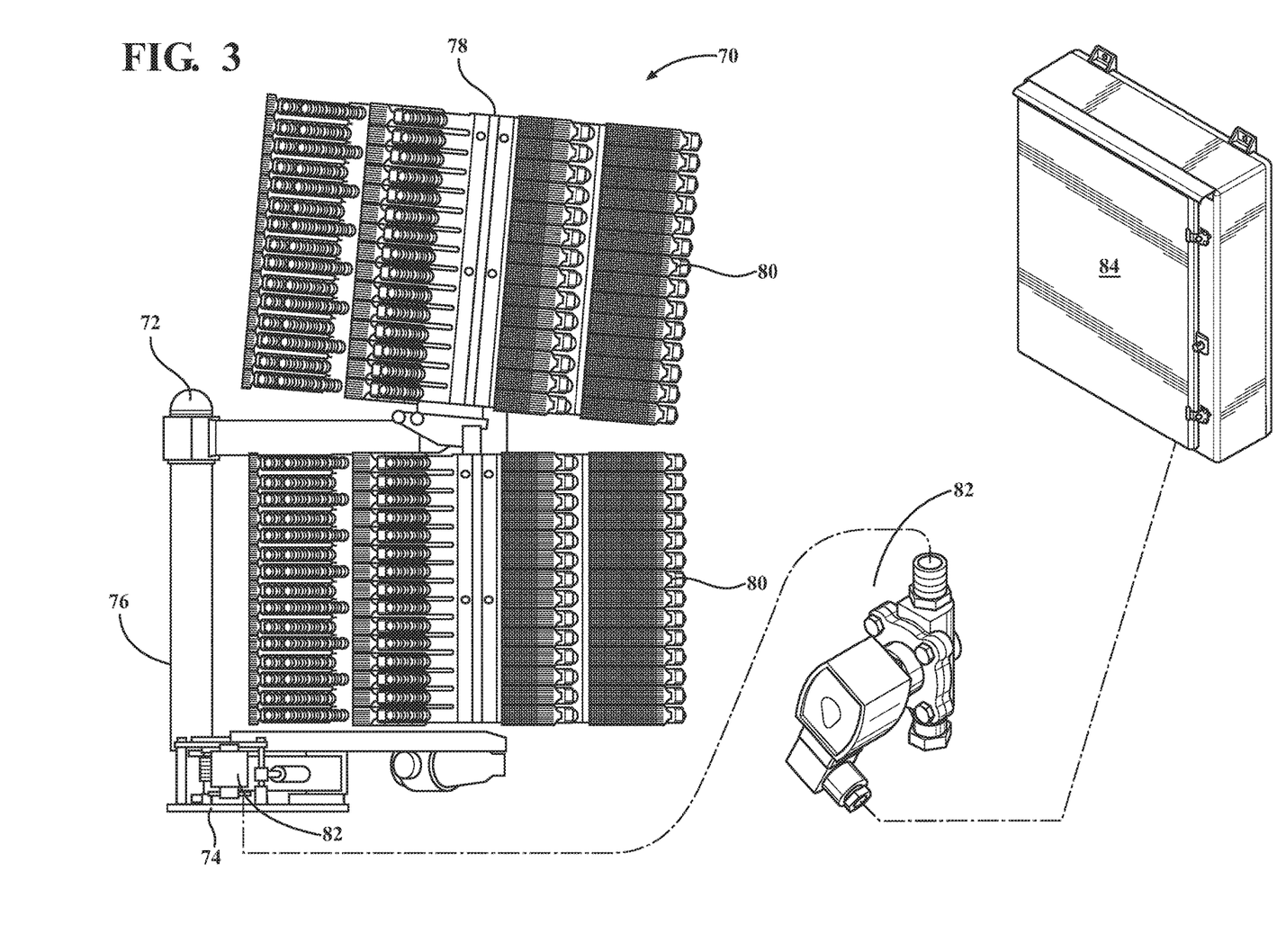
FIG. 3 is a schematic illustration of a fluid delivery system for a vehicle wash process in accordance with still another aspect of the present disclosure.

With reference to FIG. 3, according to another aspect, the vehicle wash component can be configured as a rotary brush 70 with an axis of rotation. The rotary brush 70 can include a frame portion 72 with a base portion 74 and a vertical upright portion 76. The rotary brush 70 can include a shaft portion 78, which is in communication with a plurality of wash media elements 80 that are configured to contact a vehicle exterior to effectuate the cleaning process. The wash media elements 80 may be conventional cloth media elements. According to another aspect, they may be formed of a foam material such that they are self-supporting along their length. As shown, one or more fluid nozzles 82 can be disposed on the frame portion 72 to emit fluid directly onto a vehicle exterior or the wash media elements. It will be appreciated that the nozzles can operate in a manner or be configured as set forth above. The fluid nozzles 82 may be in communication with a controller 84 that can vary the flow of fluid through the nozzles in a manner as discussed above.

Figure 4:
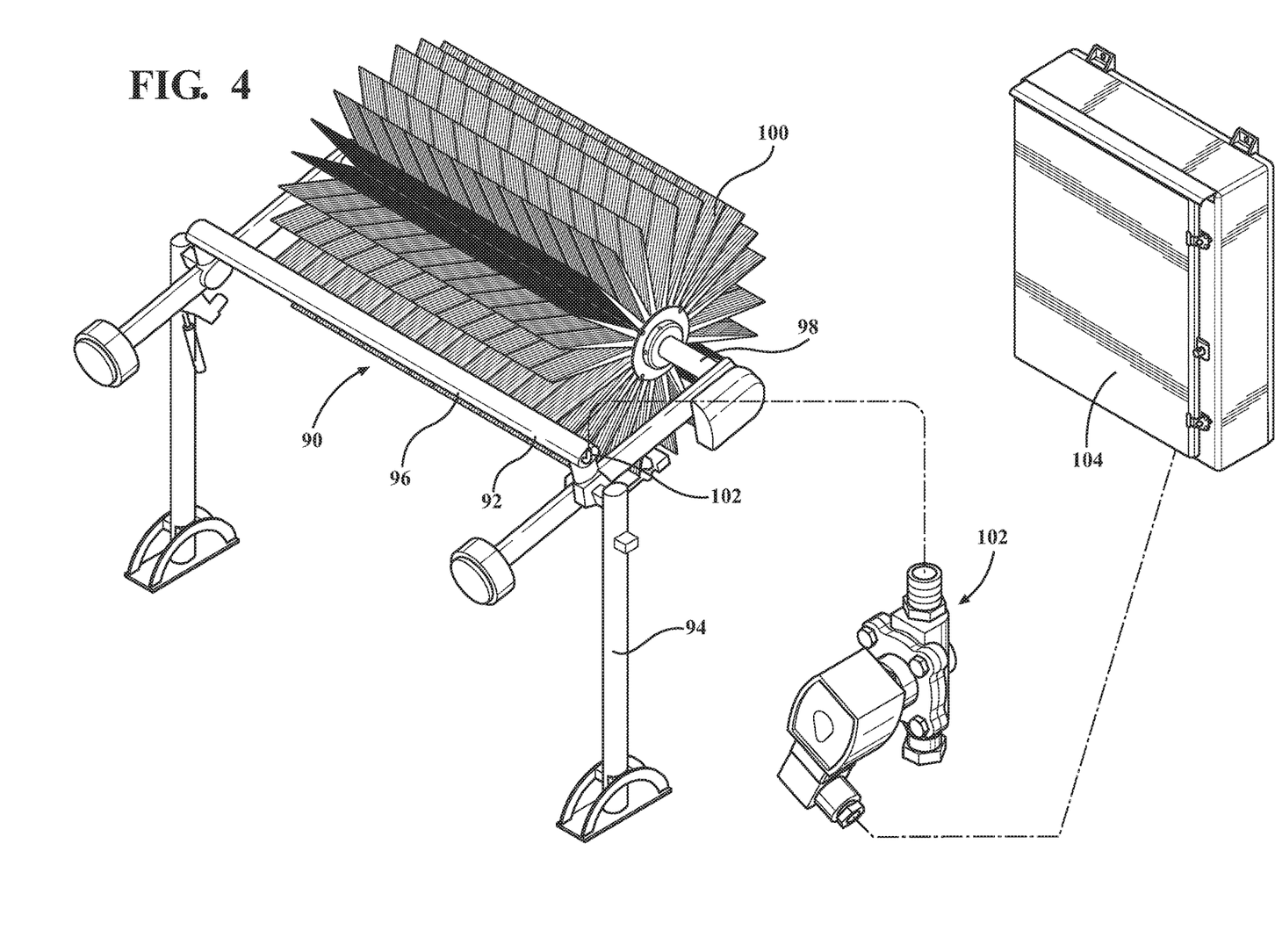
FIG. 4 is a schematic illustration of a fluid delivery system for a vehicle wash process in accordance with yet another aspect of the present disclosure.

According to yet another aspect and with reference to FIG. 4, the vehicle wash component can be configured as a top wheel 90 with a horizontal axis of rotation. The top wheel 90 can include a frame portion 92 with a vertical upright portion 94 and an overhead portion 96. The top wheel 90 can include a shaft portion 98, which is in communication with a plurality of wash media elements 100 that are configured to contact a vehicle exterior to effectuate the cleaning process. The wash media elements 100 may be conventional cloth media elements. According to another aspect, the media elements may be formed of a foam material such that they are self-supporting along their length. As shown, one or more fluid nozzles 102 can be disposed on the frame portion 72 to emit fluid directly onto a vehicle exterior or onto the wash media elements. It will be appreciated that the nozzles 102 can operate in a manner or be configured as set forth above. The fluid nozzles 102 may be in communication with a controller 104 that can vary the flow of fluid through the nozzles in a manner as discussed above.

According to a still further aspect, the fluid delivery system 10 may be configured to vary the flow of fluid through the nozzles 28, 62, 82, 102 when a vehicle is disposed adjacent the vehicle treatment component in a position where it can be cleaned or where fluid can be emitted directly onto the vehicle. According to another aspect, the fluid delivery system can allow for varying the flow of fluid through the nozzles while the vehicle treatment component is engaging the vehicle exterior. For example, while wash media elements of a vehicle wash brush are engaging the vehicle exterior, the fluid flow through one or more nozzles can be varied. This is contrasted from turning the entire component off, such as when no vehicle is disposed adjacent the component for treatment.

According yet another aspect, the system could include a selection option that can allow the wash system to be operated in either a normal mode or a water savings mode. A first flow rate can be associated with the normal mode. A second flow rate can be associated with the water savings mode. According to an aspect, the second flow rate can be a lower flow rate than the first flow rate such that the system can use less water in the water savings mode. According to a still further aspect, in the water savings mode, the controller can vary the flow rate of water through the nozzles within a single wash process. According to an aspect, this can be accomplished by pulsing fluid through the nozzles by intermittent application of fluid to the vehicle in order that the system uses less water or fluid in the water savings mode than in the normal mode. This can also be accomplished by emitting fluid through the nozzles at different flow rates during a single wash process.

According to an aspect, the nozzles can operate in the water savings mode to use less water based on either a time variable or an amount of water emitted variable. For example, the nozzles can be controlled to emit less fluid over a given time in the water savings mode. According to an aspect, the nozzles could include a pressure regulator valve that can vary the pressure at the nozzles based on an applied voltage. For example, a minimum voltage can be associated with one flow rate and a maximum voltage can be associated with a second flow rate. According to another aspect, this can be accomplished by a control system in communication with a hydraulic proportional valve. It will be appreciated that the flow rate can be varied in a variety of different ways. It will also be appreciated that a variety of other types of valves could be employed for these purposes.

According to a still further aspect, instead of varying the flow rate through the nozzles, the time period in which the nozzles emit fluid could varied to effectuate a reduction in water usage. This can be accomplished by a control system that pulses the fluid through the nozzles in an intermittent fashion by alternatively allowing or restricting flow therethrough.

According to an aspect, the system can allow for selective implementation of the water savings mode. For example, the system can include a green button labeled "water savings" disposed adjacent an entrance of the wash system that allows users to elect to have a reduced amount of water used as part of the wash process for their vehicle. This can be an attractive feature for user's concerned about green or energy savings initiatives. Once the button is activated, a signal can be sent to the controller to operate the wash in a water savings mode. It will be appreciated that vehicle operators could be permitted to implement the water savings mode in a variety of other suitable ways.

According to a further aspect, the water savings mode can be selectively implemented by a wash operator based on need. For example, if the system or wash operator detects a relatively clean vehicle, the water savings mode can be implemented. This can be done manually by a wash operator upon visual inspection of the vehicle by interacting with the control system. Alternatively, this can be accomplished automatically based on feedback from a sensor or the like reflecting a relative cleanliness of a vehicle exterior that is suitable for implementation of the water savings mode. It will be appreciated that a variety of detection mechanism can be employed to provide information about the controller.

According to yet another aspect, the system can be set up such that the default operation could be a water savings mode. According to an aspect, a brown button can be presented to a vehicle operator that allows them to select to have a greater amount of water applied to their vehicle as part of the wash process. In this event, a vehicle operator can actuate the brown button (i.e., "dirty vehicle" button) and a signal can be sent to the controller to implement the dirty vehicle mode, which can result in increased water usage for that vehicle.

The dirty vehicle mode can also be implemented by a vehicle operator manually upon inspection of the vehicle. According to another aspect, the system can implement the dirty vehicle mode automatically based on feedback from a sensor or the like reflecting a dirty vehicle requiring a higher pressure water being emitted from the nozzles to ensure removal of dirt form the vehicle.

While the dirty vehicle mode can result in a variance in water flow rate or in time duration of water application, it can result in a variance of other factors. For example, upon implementation of the dirty vehicle mode (or the water savings mode), the controller can vary the speed of operation of the conveyor. Upon implementation of a dirty vehicle, the controller can slow the conveyor speed such that the vehicle wash process for a particular vehicle can take a longer period of time. This can result in the vehicle being exposed to the vehicle treatment components and fluid application for an increased period of time. For example, a typical conveyor can operate at a rate of 120 vehicle washes per hour. Upon application of the dirty vehicle mode, the conveyor speed can be operated at a rate of 80 vehicle washes per hour.

In operation, according to this aspect, the conveyor speed can operate at a reduced speed while the designated vehicle passes through the wash process. Upon the designated vehicle exiting the wash process, the controller can automatically return the conveyor to its normal mode speed. According to an aspect, in the dirty vehicle mode where the controller reduces the conveyor speed, the controller can also vary the flow rate (or time of flow) through the nozzles to match the conveyor speed.

This can allow the system to selectively apply different modes on an individual vehicle basis. It will be appreciated that the system could include a variety of different modes that can be implemented by the controller based on a variety of different factors. It will also be appreciated that the controller can implement various modes by varying a combination of factors such as a combination of two or more of time, flow rate, and conveyor speed.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The invention claimed is:

1. A vehicle wash system, comprising:
   a vehicle treatment component configured to be disposed adjacent a vehicle treatment area for treating a vehicle exterior;
   at least one fluid delivery orifice associated with the vehicle treatment component and in communication with a source of fluid;

a controller in communication with the at least one fluid delivery orifice and configured to operate the at least one fluid delivery orifice in a normal state of operation with a first flow rate, and a water savings state of operation with the fluid pulsed between a second flow rate and a third flow rate being different than the first flow rate;

a sensor in communication with the controller and configured to detect a cleanliness of the vehicle exterior in the vehicle treatment area;

wherein the controller is further configured to automatically switch from the normal state of operation to the water savings state of operation based on the detected cleanliness of the vehicle exterior from the sensor during a single wash process of the vehicle.

2. The vehicle wash system of claim 1, wherein the fluid delivery orifice is a nozzle.

3. The vehicle wash system of claim 1, wherein the at least one fluid delivery orifice is configured such that the first flow rate is greater the second and third flow rates.

4. The vehicle wash system of claim 1, wherein in the water savings state of operation, the fluid is pulsed between the second flow rate at a first non-zero predetermined duration of time and the third flow rate at a second non-zero predetermined duration of time.

5. The vehicle wash system of claim 4, wherein the first non-zero predetermined duration of time is greater than the second non-zero predetermined duration of time.

6. The vehicle wash system of claim 4, wherein the first non-zero predetermined duration of time is equal to the second non-zero predetermined duration of time.

7. The vehicle wash system of claim 1, wherein the vehicle treatment component is a rotary brush having an axis of rotation and a plurality of media elements configured to engage the vehicle exterior.

8. The vehicle wash system of claim 1, wherein the vehicle treatment component includes a frame portion and wherein the at least one fluid delivery orifice is disposed on the frame portion.

9. The vehicle wash system of claim 1, wherein the at least one fluid delivery orifice includes a plurality of fluid delivery orifices and wherein the fluid delivery orifices each include a solenoid valve that varies the fluid flow through the fluid delivery orifices.

10. The vehicle wash system of claim 1 further including a solenoid including a relay and potentiometer connected to said at least one fluid delivery orifice and said controller for changing said at least one fluid delivery orifice between said first, second and third flow rates.

11. The vehicle wash system of claim 1 wherein both the first flow rate and the second flow rate are greater than zero.

12. The vehicle wash system of claim 1 wherein the vehicle treatment component is a brush, and wherein the controller is configured to change between the first and second states of operation when the brush engages an exterior of the vehicle.

13. A vehicle wash system, comprising:
a vehicle treatment component configured to be disposed adjacent a vehicle treatment area;
a fluid delivery orifice associated with the vehicle treatment component and configured to emit a stream of fluid therefrom, the fluid delivery orifice in communication with a source of fluid;
a sensor configured to detect a cleanliness of a vehicle exterior in the vehicle treatment area;
a controller in communication with the fluid delivery orifice and the sensor, the controller configured to automatically vary a flow rate of fluid flowing through the fluid delivery orifice between a normal state of operation with a first flow rate, and a water savings state of operation with the fluid pulsed between a second flow rate and a third flow rate based on the detected cleanliness of the vehicle from the sensor while the vehicle is disposed adjacent the vehicle treatment area during a single wash process of the vehicle, wherein the second and third flow rates are different than the first flow rate.

14. The vehicle wash system of claim 13, wherein the fluid delivery orifice is a nozzle.

15. The vehicle wash system of claim 13, wherein in the water savings state of operation, the fluid is pulsed between the second flow rate at a first non-zero predetermined duration of time and the third flow rate at a second non-zero predetermined duration of time.

16. The vehicle wash system of claim 15, wherein the first duration of time and the second duration of time are equal.

17. The vehicle wash system of claim 15, wherein the first duration of time is greater than the second duration of time such that fluid flow through the fluid delivery orifice is pulsed.

18. The vehicle wash system of claim 15, wherein one of the the second flow rate and the third flow rate is zero.

19. The vehicle wash system of claim 13, wherein the first flow rate is greater than the second flow rate.

20. The vehicle wash system of claim 13, wherein the fluid delivery orifice includes a closure mechanism to vary fluid flow through the fluid delivery orifice.

21. The vehicle wash system of claim 13, wherein the controller is configured to emit fluid through the fluid delivery orifice in the normal state of operation at the first flow rate for application to a front portion of the vehicle and at the water savings state of operation at the second and third flow rates for application to a rear portion of the vehicle.

22. The vehicle wash system of claim 13, wherein the vehicle treatment component is a rotary brush having a frame portion, an axis of rotation and a plurality of wash media elements and wherein the vehicle treatment component includes the frame portion and wherein the fluid delivery orifice is disposed on the frame portion.

23. A vehicle wash system, comprising:
a vehicle treatment component configured to be disposed adjacent a vehicle treatment area for treating a vehicle exterior;
at least one fluid delivery orifice associated with the vehicle treatment component and in communication with a source of fluid;
a controller in communication with the at least one fluid delivery orifice and configured to selectively vary a flow rate of fluid flowing through the at least one fluid delivery orifice, and configured to vary a duration of time at which fluid is pulsed through the fluid delivery orifice;
a sensor in communication with the controller and configured to detect a cleanliness of the vehicle exterior in the vehicle treatment area;
wherein the controller is configured to automatically switch operation of the fluid delivery orifice from a normal state of operation to a water savings state of operation based on the detected cleanliness of the vehicle exterior from the sensor during a single wash process of the vehicle, and wherein the controller is configured to change at least one of the flow rate of fluid flowing through the at least one fluid delivery orifice and the duration of time at which the fluid is pulsed through the fluid delivery orifice when operation of the fluid delivery orifice is switched from the normal state of operation to the water savings state of operation.

\* \* \* \* \*